(12) United States Patent  
Alonso et al.

(10) Patent No.: US 11,520,308 B2  
(45) Date of Patent: Dec. 6, 2022

(54) PROGRESSIVE LENSES WITH VARIABLE REDUCED PERIPHERAL MEAN SPHERE

(71) Applicant: Indizen Optical Technologies of America, LLC, Torrance, CA (US)

(72) Inventors: José Alonso, Madrid (ES); Eva Chamorro, Madrid (ES); Eduardo Pascual, Madrid (ES); José Miguel Cleva, Madrid (ES)

(73) Assignee: Indizen Optical Technologies of America, LLC, Torrance, CA (US)

( * ) Notice: Subject to any disclaimer, the term of this patent is extended or adjusted under 35 U.S.C. 154(b) by 34 days.

(21) Appl. No.: 16/942,366

(22) Filed: Jul. 29, 2020

(65) Prior Publication Data

US 2022/0035335 A1 Feb. 3, 2022

(51) Int. Cl.
   G05B 19/4097   (2006.01)
   G02C 7/02      (2006.01)

(52) U.S. Cl.
   CPC ......... *G05B 19/4097* (2013.01); *G02C 7/028* (2013.01); *G05B 2219/35261* (2013.01)

(58) Field of Classification Search
   CPC .... G02C 7/028; G02C 7/061; G05B 19/4097; G05B 2219/35261
   See application file for complete search history.

(56) References Cited

U.S. PATENT DOCUMENTS

| | | |
|---|---|---|
| 4,461,550 A | 7/1984 | Legendre |
| 4,537,479 A | 8/1985 | Shinohara et al. |
| 4,676,610 A | 6/1987 | Barkan et al. |
| 4,786,160 A | 11/1988 | Furter |
| 4,838,675 A | 6/1989 | Barkan et al. |
| 4,854,689 A | 8/1989 | Dufour et al. |
| 4,861,153 A | 8/1989 | Winthrop |
| 5,123,725 A | 6/1992 | Winthrop |
| 5,488,442 A | 1/1996 | Harsigny et al. |
| 5,861,935 A | 1/1999 | Morris et al. |
| 6,231,184 B1 | 5/2001 | Menezes et al. |
| 6,260,967 B1 | 7/2001 | Edwards et al. |
| 6,318,859 B1 | 11/2001 | Baudart et al. |

(Continued)

OTHER PUBLICATIONS

World Intellectual Property Organization, International Search Report and Written Opinion for International Application No. PCT/US2018/018245, dated Mar. 8, 2018, 9 total pages.

*Primary Examiner* — Chun Cao  
(74) *Attorney, Agent, or Firm* — SoCal IP Law Group LLP; Mark Andrew Goldstein

(57) ABSTRACT

An improved method for configuring progressive ophthalmic lenses is disclosed. The method includes computing an improved merit function that modulates reduction of peripheral values of the mean sphere according to the prescription sphere. According to the method the amount of reduction of mean sphere of the lens peripheral regions is dependent on the prescription resulting from a modified merit function. As such, the reduction of peripheral mean sphere varies based on the prescription. According to the modified merit function and resulting improved merit function, the greater the hyperopia and/or presbyopia defined in a prescription, the smaller the reduction of the peripheral value of mean sphere. Accordingly, when the peripheral mean sphere reduction is relaxed, a near region is made wider.

28 Claims, 9 Drawing Sheets

(56) References Cited

U.S. PATENT DOCUMENTS

| | | |
|---|---|---|
| 6,652,096 B1 | 11/2003 | Morris et al. |
| 6,793,340 B1 | 9/2004 | Morris et al. |
| 6,956,682 B2 | 10/2005 | Wooley |
| 7,229,173 B2 | 6/2007 | Menezes |
| 7,475,985 B2 | 1/2009 | Blum et al. |
| 9,557,578 B2 | 1/2017 | Moine et al. |
| 10,330,950 B2 * | 6/2019 | Alonso ................. G02C 7/065 |
| 2004/0263778 A1 | 12/2004 | Wooley |
| 2005/0122470 A1 | 6/2005 | Perrott et al. |
| 2011/0187993 A1 | 8/2011 | Alonso Fernandz et al. |
| 2012/0300172 A1 | 11/2012 | Berthezene et al. |

* cited by examiner

PROGRESSIVE LENSES WITH VARIABLE REDUCED PERIPHERAL MEAN SPHERE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the reproduction by anyone of the patent disclosure as it appears in the Patent and Trademark Office patent files or records, but otherwise reserves all copyright and trade dress rights whatsoever.

BACKGROUND

Field

This disclosure relates to ophthalmic lenses used for both distance vision and near vision known as progressive addition lenses.

Description of the Related Art

Progressive addition lenses are configured in an attempt to allow a wearer to comfortably transition between lens powers within the lens in a smooth and seamless manner. To achieve this the configuration of progressive ophthalmic lenses typically uses the following merit function.

$$\Phi_0 = \sum_{i=1}^{N}\alpha_i(C_i - C_{0i})^2 + \sum_{i=1}^{N}\beta_i(A_i - A_{0i})^2 + \sum_{i=1}^{N}\gamma_i(S_i - S_{0i})^2 +$$
$$\sum_{k=1}^{M_c}\delta_k(C_k - C_{0k})^2 + \sum_{k=1}^{M_c}\epsilon_k(A_k - A_{0k})^2 + \sum_{k=1}^{M_c}\phi_k(S_k - S_{0k})^2$$

In the merit function, indexes i and k label points on the lens at which power is evaluated. For example, a grid of points regularly or irregularly scattered over the lens may be selected, and the gaze directions passing through each of these points may be evaluated. The index i traverses sight directions scattered or distributed over the lens, but not on the principal line. The index k traverses sight directions that pass through the principal line. In the merit function, $C_{0i}$ and $A_{0i}$ are the desired or optimal cylinder and cylinder axis at point i, whereas $C_i$ and $A_i$ are the cylinder and cylinder axis the lens actually has at the particular point i at a particular stage during optimization. Similarly, $S_{0i}$ is the desired or optimal sphere at point i, and $S_i$ is the sphere the lens actually has at this point at a particular stage during optimization. The variables $\alpha_i$, $\beta_i$ and $\gamma_i$ are numbers used as weights that give different importance to different points. There are $M_c$ sight directions going through the principal line of the progressive lens. These sight directions may be evenly distributed along the principal line, from the top to the bottom of the lens. The target astigmatism at the principal line is $C_{0k}$, the target axis is $A_{0k}$, and the target sphere value at the principal line is $S_{0k}$. The values $C_k$, $A_k$ and $S_k$ are the actual values of cylinder, cylinder axis and sphere that the lens has at each point on the principal line. The variables $\delta_k$, $\epsilon_k$ and $\phi_k$ are weights used to optimize the cylinder, cylinder axis and sphere along the principal line.

At a multiple stages during optimization of a progressive lens design, the actual cylinder and sphere produced by the lens are calculated, and the value of the merit function $\Phi_0$ is computed. The theoretical surface of the lens is modified, and the merit function $\Phi_0$ is recomputed and compared with the previous value of the merit function for the previous point. This is reflected in the range i=1 through N in summations in the merit function. If the new value is smaller, the surface modifications are deemed acceptable. In this way, the merit function is evaluated through all points until the smallest possible value of the merit function $\Phi_0$ is achieved.

The prior paragraphs present a simplified description of the optimization process for progressive lens construction, and the actual process may differ considerably, though the final objective is the same: to produce a lens with distributions of C, A and S as similar as possible to the proposed objective distribution of $C_0$, $A_0$ and $S_0$ over the entire lens, but especially on the principal line of the lens.

A problem with the traditional merit function used in progressive addition lens design is that the power components S, C and A are not independent of one another. These power components cannot be distributed independently over the lens surface. In practice, the resulting distributions of $C_0$, $A_0$ and $S_0$ are not correctly established on the lens such that the optimization of the merit function yields less than optimal and sometimes incorrect results. This causes progressive lenses to be less than optimal and sometimes unsatisfactory to the lens wearing consumer.

The method described in U.S. Pat. No. 10,330,950 disclosed an improved merit function that provides lenses that were more effective and pleasing than traditional progressive lenses. The method provided a constant calculation with resulting lenses. However, the success of the method described in U.S. Pat. No. 10,330,950 is not uniform across a range of prescriptions. In practice, the more myopic the individual, the larger the satisfaction and improvement obtained from the use of the calculation providing reduced and more stable peripheral mean sphere and resulting lenses. However, the more hyperopic the individual, the smaller the improvement obtained from the use of the proposed calculation and resulting lenses. This disclosure provides a variation and improvement of the calculation providing reduced and more stable peripheral mean sphere and resulting lenses which better takes into account the needs of persons with a wider range of prescriptions.

Figure 1:
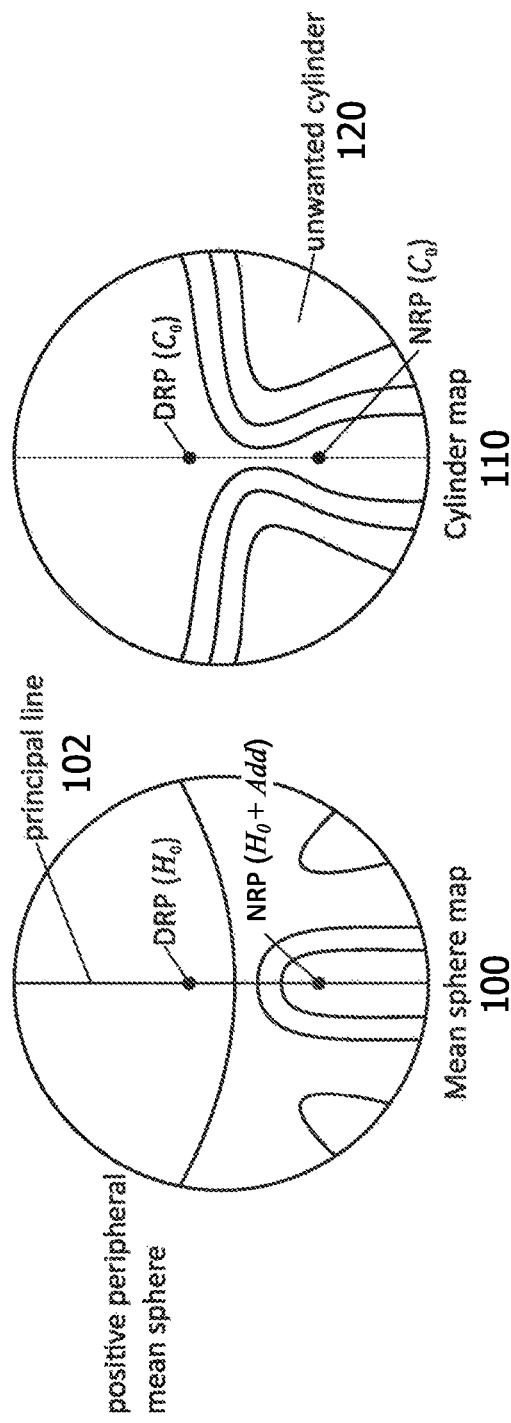
FIG. 1 are two dimensional example mean sphere and cylinder maps for a lens.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

The techniques described herein provide for generating a prescription-modulated lens design that results in better performance for a range of prescriptions, from myopic to hyperopic and in between, and also from low to high presbyopia. According to the techniques described herein, one benefit is increased visual acuity in the periphery of the far vision field. According to the method described herein, using specific calculations that allow modulation of peripheral mean sphere, the width of the near region is changed, along with the reduction of peripheral mean sphere, to provide better fit across a large range of prescriptions. As the reduction of peripheral mean sphere gets smaller with more positive prescriptions, the width of the near region is made larger. That is, the width of the near region is a monotonic growing function of the mean sphere of the prescription. This results in generating a lens design that provides better performance for a range of prescriptions, for both hyperopic and myopic prescriptions. The method described herein is an improvement of U.S. Pat. No. 10,330,950.

Lenses with a large reduction of peripheral mean sphere are typically given to myopic users. According to the methods described herein, as a prescription moves from myopia toward hyperopia, the reduction of peripheral mean sphere is made smaller, and the near region is made wider. As such, the reduction of peripheral mean sphere varies based on the prescription. This results in well performing, pleasing lenses for a wide array of prescriptions.

So that the features and benefits of the method can be better understood, here is a listing of important terms and calculations used herein.

The term "prescription" means the refractive error of a given person. The term "prescription" is quantified as the power of a lens worn in front of the eye, at a given distance, so that the eye can sharply focus on distant objects. Typically, the vertex of the back surface of the lens is located 13 mm from the corneal vertex. The prescription has three parameters, typically sphere, S, cylinder C and axis A. The prescription is represented by the three parameters as $[S_0, C_0 \times A_0]$.

The term "mean sphere" is represented as $H_0$ and defined by the equation $H_0 = S_0 + C_0/2$. The refractive error or prescription is myopic when $H_0 < 0$, and hyperopic when $H_0 > 0$.

The term "accommodation" refers to an additional increment of optical power in an eye that allows a person to focus on near objects. The range of accommodation decreases with age, and this effect is known as presbyopia.

The term "addition" refers to additional or extra power in a lens that compensates for the accommodation loss experienced by the presbyopic person wearing the lens. The term addition is designated by Add. A prescription may also include addition values.

The term "progressive lenses" refers to lenses in which power increases smoothly from the prescription value $[S_0, C_0 \times A_0]$ at a point intended to focus on far objects (referred to as the "distance reference point" or "DRP") to the near-prescription value $[S_0+\text{Add}, C_0 \times A_0]$, a point intended to focus on near objects (referred to as the "near reference point" or "NRP"). Power changes continuously across the surface of a progressive lens. To represent the power variations of a progressive lens, maps of mean sphere H and cylinder C, are used. Example mean sphere (100) and cylinder (110) maps are shown in FIG. 1. The continuous variation of power of a progressive lens causes unwanted cylinder (120) to appear in some regions of the lens.

The term "principal line" (102) refers to a curve approximately vertical on progressive lenses along which the power increases smoothly without significant amounts of unwanted cylinder. The distance reference point (DRP) and the near reference point (NRP) are located on the principal line. Typically, the DRP is located slightly above the pupil (when the user looks straight ahead) while the NRP is located below the pupil, for example, about 15 to 20 mm below the pupil.

According to the method described herein, the amount of reduction of mean sphere in the peripheral region of the lens is dependent on the user's prescription such that the greater the hyperopia and/or presbyopia, the smaller the reduction of the peripheral value of mean sphere. It follows that, as the constraint of peripheral mean sphere reduction is relaxed, the near region is made wider without a significant increase of the maximum value of unwanted astigmatism.

Figure 2:
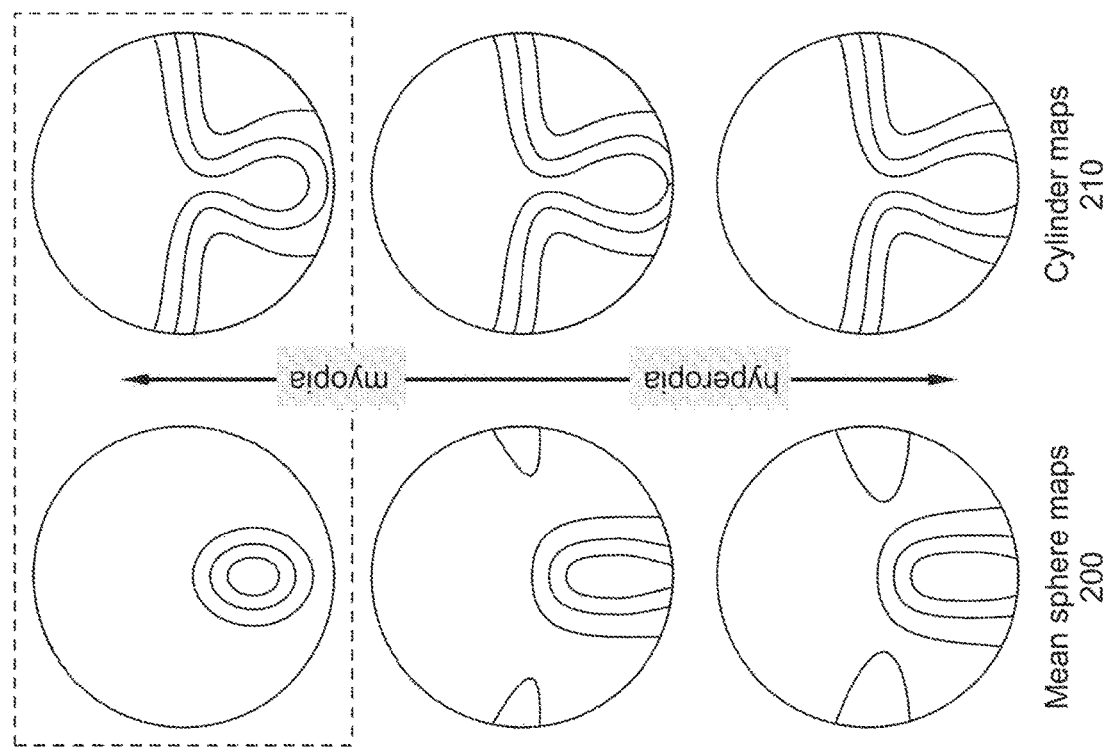
FIG. 2 are a series of two dimensional mean sphere and cylinder maps for a lens at three different distances.

Referring to FIG. 2, the maps of mean sphere (200) and cylinder (210) of a lens for moderate hyperopia computed according to the method described herein are shown. The near region is slightly wider than in earlier methods, and the increase of astigmatism below the NRP is smaller. Also, the peripheral value of mean sphere is larger with respect to the method described in U.S. Pat. No. 10,330,950.

Referring to the third (bottom) row in FIG. 2, there is shown maps of mean sphere and cylinder of a lens for medium to high hyperopia computed according to the method described herein. The near region is wider, and the increase of astigmatism below the NRP is small. Also, the peripheral value of mean sphere is larger with respect to the lenses produced according to the earlier method, though it is still slightly smaller than typical values found in lenses according to the earlier method in U.S. Pat. No. 10,330,950.

The Method

To compute the configuration of a pleasing, more effective progressive lens, an enhanced, improved merit function is used. The method uses the total merit function computed as $$\Phi' = \Phi''_0 + s(H_0)\Phi'_1.$$

Each of the terms of the improved merit function are described in the following paragraphs.

Figure 3:
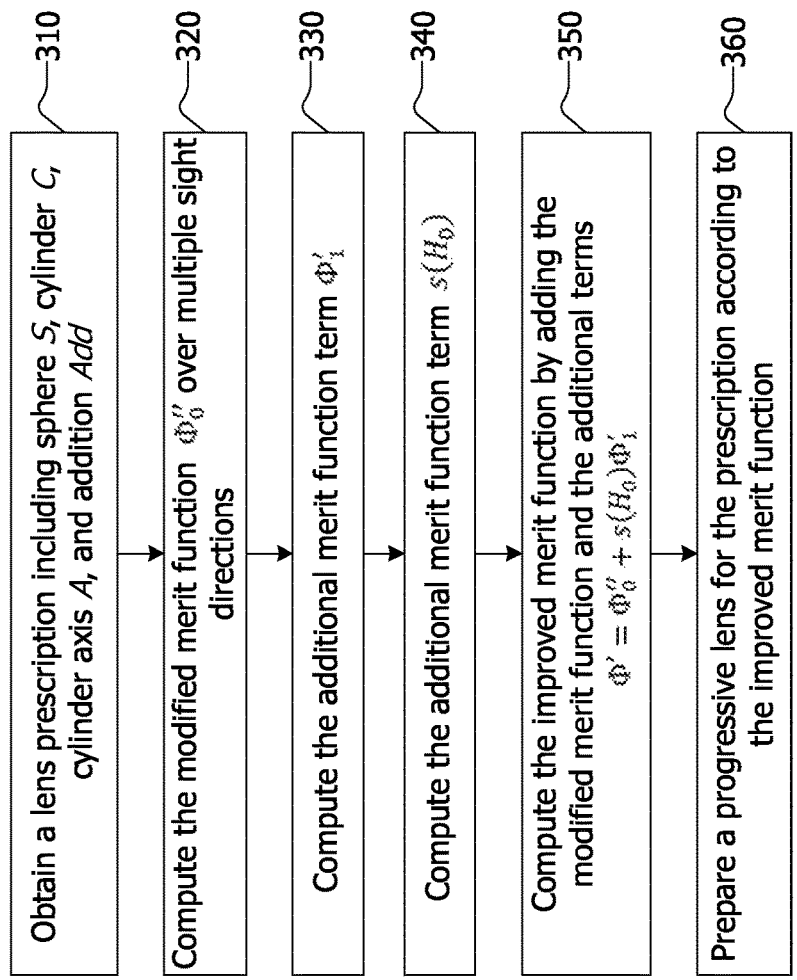
FIG. 3 is a flow chart of an improved method of calculating the configuration of a progressive lens.

Referring now to FIG. 3, a method of improved lens configuration is disclosed. Initially, a lens prescription including sphere S, cylinder C, cylinder axis A and addition Add is obtained, as shown in block 310. According to the improved merit function, the first term, the modified merit function $\Phi''_0$ is computed, as shown in block 320, such that $$\Phi''_0 = \sum_{i=1}^{N} \alpha_i (C_i - C_{0i})^2 + \sum_{i=1}^{N} \beta_i (A_i - A_{0i})^2 + \sum_{i=1}^{N} \gamma_i (S_i - S_{0i})^2 + \sum_{k=1}^{M''_c} \delta_k (C_k - C_{0k})^2 + \sum_{k=1}^{M''_c} \epsilon_k (A_k - A_{0k})^2 + \sum_{k=1}^{M''_c} \phi_k (S_k - S_{0k})^2,$$

where i is an index running through multiple sight directions out of the principal line of a progressive lens, k refers to the principal line, and 0 refers to the target values of the power components on the principal line. For example, a group of points regularly arranged or irregularly scattered over the lens may be used, such that the gaze directions passing through each of these points. An example of a regularly arranged group of points is a grid. As such, $C_{0i}$ and $A_{0i}$ are the cylinder ($C_{0i}$) and cylinder axis ($A_{0i}$) at point i, where $C_i$ and $A_i$ are the cylinder and cylinder axis the lens has at point i at a particular stage of lens optimization. That is, cylinder $C_{0i}$ and axis $A_{0i}$ are the objective or target values to be achieved where cylinder $C_i$ and axis $A_i$ are the actual values of the lens. Similarly, $S_{0i}$ is the sphere at point i, and $S_i$ is the sphere the lens has at point i at a particular stage of lens optimization. $\alpha_i$, $\beta_i$ and $\gamma_i$ are numbers that serve as weights to give different importance to different points. These weights are real numbers, are selected by trial and error, and may be tuned over multiple design iterations. There are also $M''_c$ sight directions through the principal line of the progressive lens. In one embodiment, these sight directions are evenly distributed along the principal line, from the top to the bottom of the lens. The target cylinder, cylinder axis and sphere at the principal line are $C_{0k}$, $A_{0k}$, and $S_{0k}$, respectively. If no unwanted astigmatism is desired on the principal line, the target astigmatism and target axis are set as $C_{0k}=C_0$ and $A_{0k}=A_0$ for all k. $C_k$ and $S_k$ are the values of cylinder and sphere of the lens at each point on the principal line. $\delta_k$, $\epsilon_k$ and $\phi_k$ are weights to optimize cylinder, cylinder axis and sphere along the principal line. These weights are real numbers, are selected by trial and error, and may be tuned over multiple design iterations.

An improvement in the method is made possible by the use of $M''_c$. $M''_c$ is a subset of $M_c$. $M''_c$ does not include the points with vertical coordinates $y < y_{cutoff}$, where $y_{cutoff}$ is a function of the user prescription such that $$y_{cutoff} = NRP - f(H_0).$$

Figure 4:
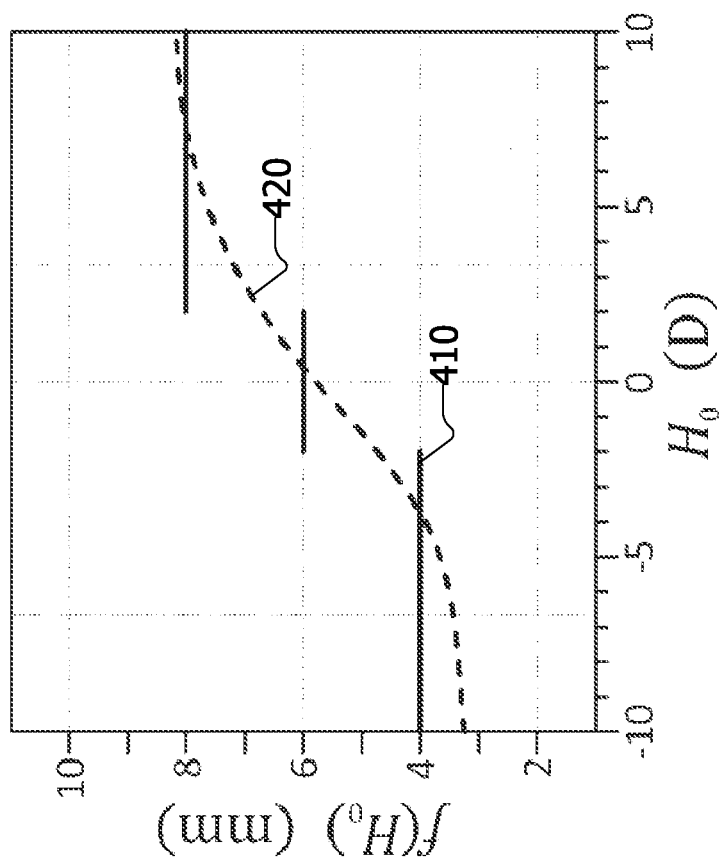
FIG. 4 is a graph showing examples of function $f(H_0)$.

This function is strictly monotonic and decreases as $H_0$ increases. An example of this function is:

$$f(H_0) = \begin{cases} V1 & \text{if } H_0 < -2 \\ V2 & \text{if } -2 \leq H_0 \leq 2 \\ V3 & \text{if } H_0 > 2 \end{cases}$$

where y coordinates are given in millimeters and mean sphere values are given in diopters. The values V1, V2 and V3 are numbers. In one embodiment V1 is 4 mm, V2 is 6 mm and V3 is 8 mm. This function $f(H_0)$ is shown graphically in FIG. 4, represented with solid lines 410. Another example for function $f(H_0)$ is a continuous function shown with a dashed line 420 in FIG. 4. Discontinuous functions such as shown by lines 410 are given as examples, as they are easy to write and understand. Equivalent continuous functions such as shown by dashed line 420 are desirable because they give a continuous transition of the design power from myopic to hyperopic and because they allow for easier minimization of merit functions. For similar reasons, continuous functions are also shown and described below regarding FIGS. 5, 7, 8 and 9.

Referring again to FIG. 3, the term $\Phi'_1$ is computed as shown in block 330 as $$\Phi'_1 = \sum_{j=1}^{M'} \delta_j (H_j - H_1(H_0))^2,$$

where $H_1$ is the target value for the mean sphere in the periphery of the lens. Important to the method described herein, the target value changes based on the prescription. For example, in one embodiment, a value for $H_1$ is $$H_1(H_0) = \begin{cases} H_0 & \text{if } H_0 < -2, \\ H_0 + 0.2 & \text{if } -2 \leq H_0 \leq 2, \\ H_0 + 0.4 & \text{if } H_0 > 2 \end{cases}$$

Figure 5:
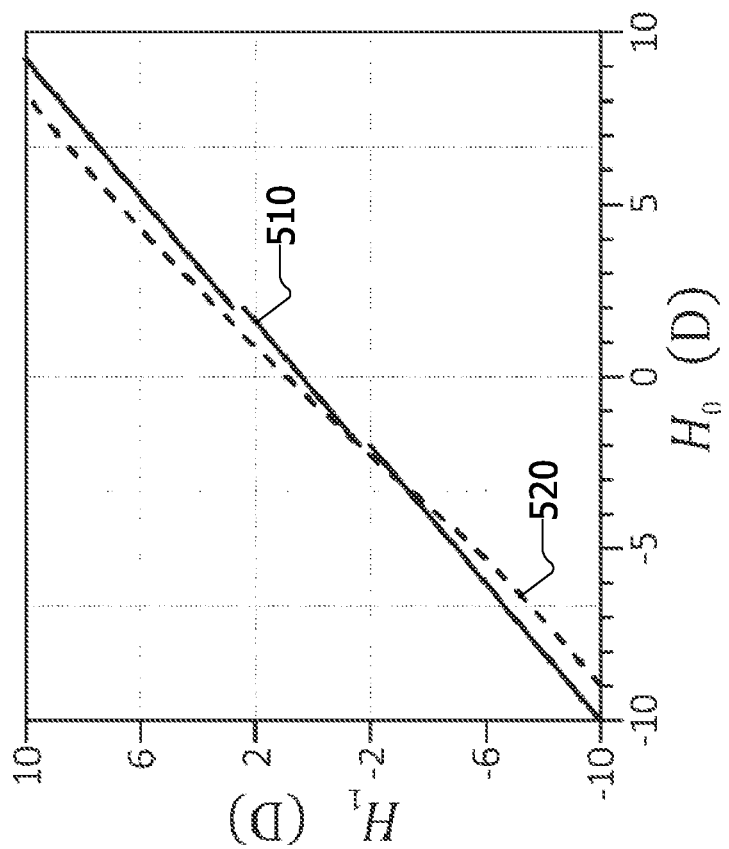
FIG. 5 is a graph showing examples of function $H_1(H_0)$.

A graphical representation of function $H_1(H_0)$ is shown in FIG. 5 as a solid line 510. The dashed line 520 in FIG. 5 represents another example of function $H_1(H_0)$, namely, a continuous function. For the method described herein, the function $H_1(H_0)$ cannot be less than $H_0$ and cannot be greater than $H_0+1$. That is, the target mean sphere will not be smaller than the prescription mean sphere, and neither will it be larger than the prescription mean sphere plus one diopter. According to the method described herein, the function $H_1(H_0)$ has values less than or equal to $H_0$ for stronger myopic prescriptions, while the function $H_1(H_0)$ has values above $H_0$, but never greater than $H_0+1D$, for the stronger hyperopic prescriptions. This is an important feature of application of the method described herein.

The set of points at which $\Phi'_1$ is computed has M' elements, and it is the set of points satisfying $$(C_j > g(H_0)) \text{ AND } (d_j > h(y_j)),$$

where $C_j$ is the unwanted cylinder at point ($x_j$, $y_j$), $g(H_0)$ is a non-negative function of the prescription mean sphere, $d_j$ is the distance from the point ($x_j$, $y_j$) to the principal line along the horizontal direction, and $h(y_j)$ is a non-negative function of the vertical coordinate. According to this method, the function $\Phi'_1$ is computed by adding $\delta_j(H_j-H_1)^2$ for those points ($x_j$, $y_j$) for which the unwanted cylinder $C_j$ is greater than $g(H_0)$, and for which the horizontal distance to the principal line is greater than $h(y_j)$. The function $h(y_j)$ defines a region 622 around the principal line. Points inside this region are not used in the computation of $\Phi'_1$, while points outside this region are used in the computation of $\Phi'_1$ to the extent the unwanted cylinder at or near those points is greater than $g(H_0)$. As such, the function $h(y_j)$ may be considered an exclusion function as it defines a region not used in the computation of $\Phi'_1$.

Figure 6:
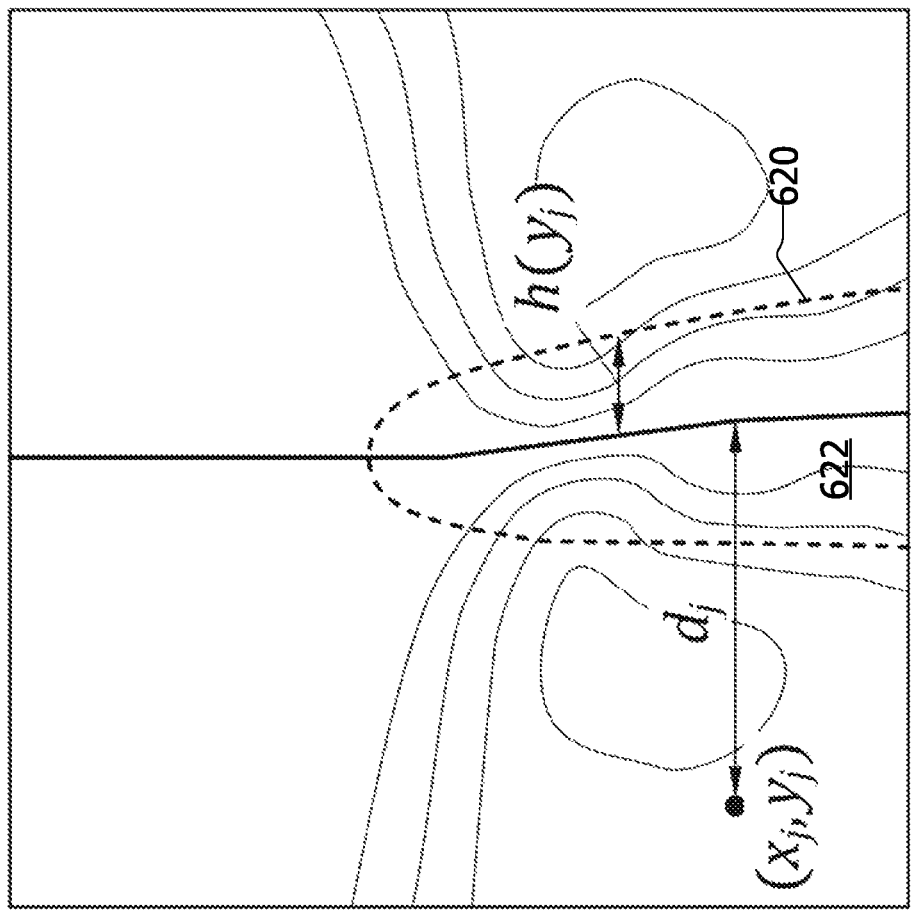
FIG. 6 is a two dimensional graph showing a region not included in computation of $\Phi'_1$ defined by function $h(y_j)$.

Referring now to FIG. 6, the region 622 defined by the function $h(y_j)$ as well as the distance $d_j$ are shown. FIG. 6 shows the distance $d_j$ from any point ($x_j$, $y_j$) to the principal line of a progressive lens and boundary 620 defined by the function $h(y_j)$. The points inside this boundary shown as a dashed line 620, at either side of the principal line, are not used in the computation of the function $\Phi'_1$.

One example for function $g(H_0)$ is $$g(H_0) = \begin{cases} W1 & \text{if } H_0 < -2, \\ W2 & \text{if } -2 \leq H_0 \leq 2, \\ W3 & \text{if } H_0 > 2 \end{cases}$$

Figure 7:
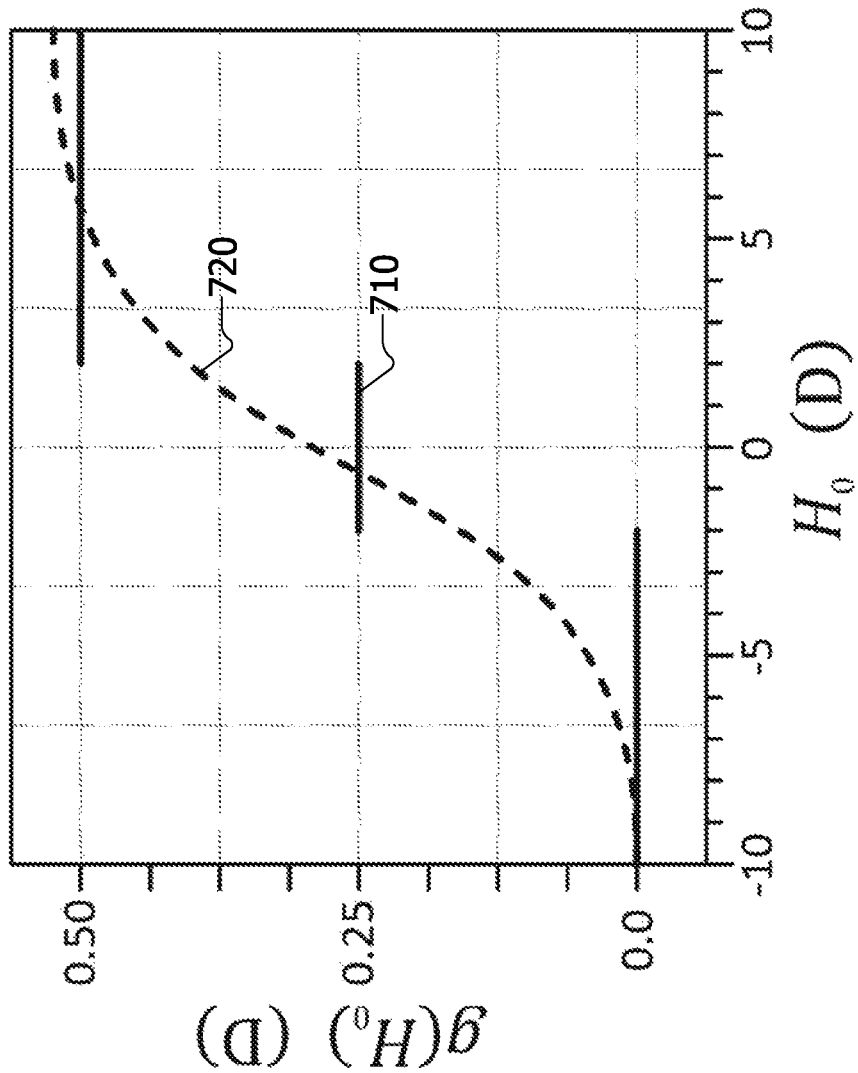
FIG. 7 is a graph showing examples of function $g(H_0)$.

A graphical representation of function $g(H_0)$ is shown in FIG. 7 represented as solid line 710. The dashed line 720 in FIG. 7 represents another example of function $g(H_0)$, namely, a continuous function. Further, the function $g(H_0)$ is non-negative, is smaller than 1 D, and is a non-decreasing function of $H_0$. Stated another way, the function $g(H_0)$ has values smaller than 1 for all prescriptions and is a monotonically increasing function of $H_0$. The values W1, W2 and W3 are, in one embodiment, 0, 0.25 and 0.5, respectively. Other values between 0 and less than 1 may be used. That is 0<W1<W2<W3<1.

An example for the function $h(y_j)$ is $$h(y_j) = \begin{cases} 0 & \text{if } y_j \geq DRP \\ 2\sqrt{DRP - y_j} & \text{if } y_j < DRP \end{cases}$$

Figure 8:
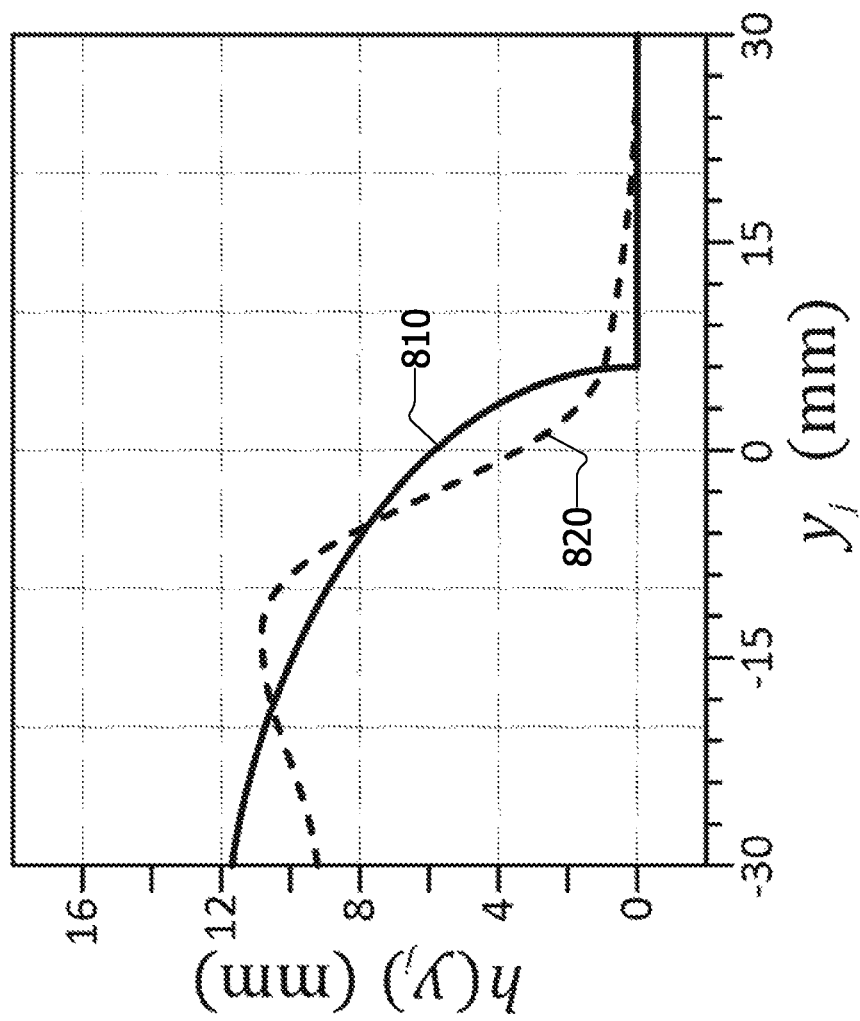
FIG. 8 is a graph showing examples of function $h(y_j)$.

Referring now to FIG. 8, function $h(y_j)$ is shown as solid line 810. Here, $h(y_j)$ is zero when $y_j \geq DRP$ (the DRP is 6 mm in this example) and $2(DRP-y_j)^{1/2}$ everywhere else. Another example for function $h(y_j)$ is shown by dashed line 820. The use of the function $h(y_j)$ avoids the use of points $(x_j, y_j)$ that are too close to the principal line in the computation of the function $\Phi'_1$. The function $h(y_j)$ is non-negative and will not be larger than 15 mm for any value of the $y_j$ coordinate.

Next, referring again to FIG. 3, the term $s(H_0)$ is computed as shown in block 340. $s(H_0)$ is a weight function that modulates the reduction of the peripheral values of the mean sphere according to the value of the prescription mean sphere. The function $s(H_0)$ is monotonically decreasing. An example for the function $s(H_0)$ is $$s(H_0) = \begin{cases} N1 & \text{if } H_0 < -2, \\ N2 & \text{if } -2 \leq H_0 \leq 2, \\ N3 & \text{if } H_0 > 2 \end{cases}$$

Figure 9:
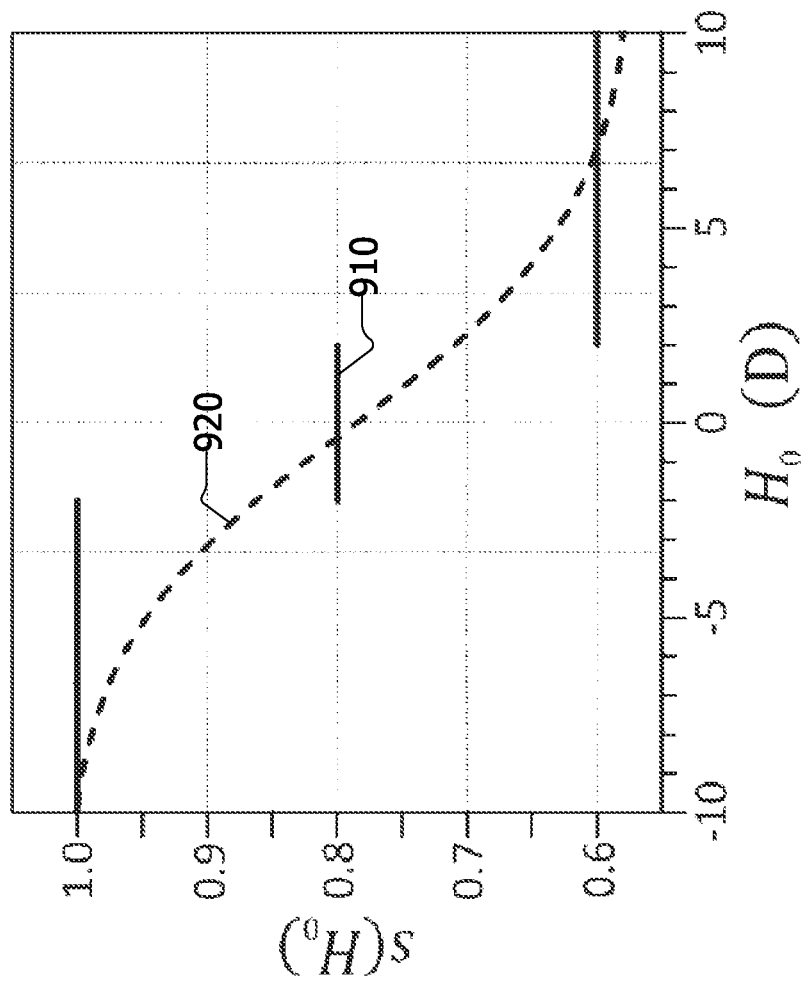
FIG. 9 is a graph showing examples of function $s(H_0)$.

Referring now to FIG. 9, a graphical representation of function $s(H_0)$ is shown represented with solid line 910. The dashed line 920 in FIG. 9 represents another example of a function $s(H_0)$, namely a continuous function. The function $s(H_0)$ has values between 1 and 0, including 1, for all prescriptions and is a monotonically decreasing function of $H_0$. That is $1 \geq N1 > N2 > N3 > 0$. The values N1, N2 and N3 are, in one embodiment, 1, 0.8 and 0.6, respectively.

Finally, referring again to FIG. 3, the total improved merit function is computed as shown in block 350 as $$\Phi' = \Phi''_0 + s(H_0)\Phi'_1.$$

A progressive lens is designed and constructed according the improved merit function applied to the prescription, as shown in block 360. More specifically, the results of applying the improved merit function are incorporated into a lens surface description file and are used to guide a cutting tool to generate a surface of the lens according to the lens surface description.

The method described herein to configure a progressive ophthalmic lens may be implemented on a computing device that includes software and hardware. A computing device refers to any device with a processor, memory and a storage device that may execute instructions including, but not limited to, personal computers, server computers, computing tablets, smart phones, portable computers, and laptop computers. These computing devices may run an operating system, including, for example, variations of the Linux, Microsoft Windows, and Apple MacOS operating systems.

The techniques may be implemented and stored as software on a machine readable storage media in a storage device included with or otherwise coupled or attached to a computing device. That is, the software may be stored on electronic, machine readable media. These storage media include magnetic media such as hard disks, optical media such as compact disks (CD-ROM and CD-RW) and digital versatile disks (DVD and DVD±RW); and silicon media such as solid-state drives (SSDs) and flash memory cards; and other magnetic, optical or silicon storage media. As used herein, a storage device is a device that allows for reading from and/or writing to a storage medium. Storage devices include hard disk drives, SSDs, DVD drives, flash memory devices, and others.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for configuring progressive lenses comprising:

receiving a lens prescription including sphere S, cylinder C, cylinder axis A and addition Add;

calculating an improved total merit function $\Phi'$ that modulates reduction of peripheral values of the mean sphere according to the prescription sphere S according to $$\Phi' = \Phi''_0 + s(H_0)\Phi'_1.$$

wherein an amount of reduction of mean sphere in of the lens peripheral regions is dependent on the prescription resulting from modified merit function $\Phi''_0$ such that the greater the hyperopia and/or presbyopia defined in the prescription, the smaller the reduction of the peripheral value of mean sphere and such that when the peripheral mean sphere reduction is relaxed, a near region is made wider, wherein $\Phi''_0$ leaves unwanted astigmatism unconstrained below cutoff height $y_{cutoff}$ which depends on the prescription mean sphere $H_0$, wherein $s(H_0)\Phi'_1$ is intended to restrict the peripheral mean sphere from growing over a determined bound depending on the prescription mean sphere, wherein $\Phi'_1$ is computed using a region of the lens and depends on the prescription mean sphere, and the region is determined by at least one region defining function, wherein $s(H_0)$ is a weight depending on the prescription mean sphere that controls the importance of the term $\Phi'_1$ in relation to the term $\Phi''_0$, manufacturing a lens according to the results of the improved merit function $\Phi'$.

2. The method of claim 1 wherein the modified merit function $\Phi''_0$ is $$\sum_{i=1}^{N} \alpha_i(C_i - C_{0i})^2 + \sum_{i=1}^{N} \beta_i(A_i - A_{0i})^2 +$$

$$\sum_{i=1}^{N} \gamma_i(S_i - S_{0i})^2 + \sum_{k=1}^{M''_c} \delta_k C_k^2 + \sum_{k=1}^{M''_c} \epsilon_k(S_k - S_{0k})^2,$$

wherein $C_{0i}$ and $A_{0i}$ are the cylinder ($C_{0i}$) and cylinder axis ($A_{0i}$) at point i, wherein Ci and Ai are the cylinder and cylinder axis the lens has at point i at a particular stage of lens optimization, wherein $S_{0i}$ is the sphere at point i, and $S_i$ is the sphere the lens has at point i at a particular stage of lens optimization, wherein $\alpha_i$, $\beta_i$ and $\gamma_i$ are numbers that serve as weights to give importance to points, and wherein M sight directions through a principal line of the progressive lens.

3. The method of claim 1 wherein the manufacturing includes incorporating the improved merit function into a lens surface description file and guiding a cutting tool to generate a surface of the lens according to the lens surface description.

4. The method of claim 1 wherein the term $\Phi'_1$ is computed as $$\Phi'_1 = \sum_{j=1}^{M'} \delta_j(H_j - H_1(H_0))^2,$$

where $H_1$ is a target value for the mean sphere.

5. The method of claim 1 wherein the function $$s(H_0) = \begin{cases} N1 & \text{if} & H_0 < -2, \\ N2 & \text{if} & -2 \le H_0 \le 2, \\ N3 & \text{if} & H_0 > 2 \end{cases}$$

wherein the function $s(H_0)$ has values between 1 and 0, including 1, such that $1 \ge N1 > N2 > N3 > 0$.

6. The method of claim 1 wherein the function $s(H_0)$ is $$s(H_0) = \begin{cases} 1 & \text{if} & H_0 < -2, \\ 0.8 & \text{if} & -2 \le H_0 \le 2, \\ 0.6 & \text{if} & H_0 > 2 \end{cases}$$

7. The method of claim 1 wherein one of the at least one region defining functions is exclusion function $h(y_j)$ which defines a region not used in the computation of $\Phi'_1$.

8. The method of claim 7 wherein $$h(y_j) = \begin{cases} 0 & \text{if } y_j \ge DRP \\ 2\sqrt{DRP - y_j} & \text{if } y_j < DRP \end{cases}$$

wherein DRP is a distance reference point.

9. The method of claim 1 wherein one of the at least one region defining functions is $g(H_0)$ which is a non-negative function of the prescription mean sphere, $d_j$ is the distance from the point $(x_j, y_j)$ to the principal line along the horizontal direction.

10. The method of claim 9 wherein $$g(H_0) = \begin{cases} W1 & \text{if} & H_0 < -2, \\ W2 & \text{if} & -2 \le H_0 \le 2, \\ W3 & \text{if} & H_0 > 2 \end{cases}$$

11. The method of claim 1 wherein the region is determined by two defining functions g and h such that $(C_j > g(H_0))$ AND $(d_j > h(y_j))$, wherein $C_j$ is unwanted cylinder at point $(x_j, y_j)$, $g(H_0)$ is a non-negative function of the prescription mean sphere, $d_j$ is the distance from the point $(x_j, y_j)$ to the principal line along the horizontal direction, $h(y_j)$ is a non-negative function of the vertical coordinate.

12. The method of claim 1 wherein the determined bound is computed as $H_0+1D$ for high hyperopes and/or high presbyopes, and the determined bound shrinks towards $H_0$ as the prescription mean sphere and/or addition gets smaller, where D is diopters.

13. The method of claim 1 wherein $y_{cutoff}$ is a function of the user prescription such that $y_{cutoff} = NRP - f(H_0)$, wherein NRP is a near reference point.

14. The method of claim 13 wherein $$f(H_0) = \begin{cases} V1 & \text{if} & H_0 < -2 \\ V2 & \text{if} & -2 \le H_0 \le 2 \\ V3 & \text{if} & H_0 > 2 \end{cases}$$

wherein y coordinate values V1, V2 and V3 are in millimeters and mean sphere values are given in diopters.

15. The method of claim 14 wherein V1 is 4 mm, V2 is 6 mm and V3 is 8 mm.

16. A computing device comprising a storage medium having instructions stored thereon which when executed by a processor in the computing device cause the processor to perform actions including:

receiving a lens prescription including sphere S, cylinder C, cylinder axis A and addition Add;

calculating an improved total merit function $\Phi'$ that modulates reduction of peripheral values of the mean sphere according to the prescription sphere S according to $\Phi' = \Phi''_0 + s(H_0)\Phi'_1$.

wherein an amount of reduction of mean sphere in of the lens peripheral regions is dependent on the prescription resulting from modified merit function $\Phi''_0$ such that the greater the hyperopia and/or presbyopia defined in the prescription, the smaller the reduction of the peripheral value of mean sphere and such that when the peripheral mean sphere reduction is relaxed, a near region is made wider, wherein $\Phi''_0$ leaves unwanted astigmatism unconstrained below cutoff height $y_{cutoff}$ which depends on the prescription mean sphere $H_0$, wherein $s(H_0)\Phi'_1$ is intended to restrict the peripheral mean sphere from growing over a determined bound depending on the prescription mean sphere, wherein $\Phi'_1$ is computed using a region of the lens and depends on the prescription mean sphere, and the region is determined by at least one region defining function, wherein $s(H_0)$ is a weight depending on the prescription mean sphere that controls the importance of the term $\Phi'_1$ in relation to the term $\Phi''_0$, preparing a lens according to the results of the improved total merit function $\Phi'$, the preparing including incorporating the improved merit function into a lens surface description file and guiding a cutting tool to generate a surface of the lens according to the lens surface description.

17. The computing device of claim 16 wherein the modified merit function $\Phi''_0$ is $$\sum_{i=1}^{N}\alpha_i(C_i - C_{0i})^2 + \sum_{i=1}^{N}\beta_i(A_i - A_{0i})^2 +$$

$$\sum_{i=1}^{N}\gamma_i(S_i - S_{0i})^2 + \sum_{k=1}^{M''_c}\delta_k C_k^2 + \sum_{k=1}^{M''_c}\epsilon_k(S_k - S_{0k})^2,$$

wherein $C_{0i}$ and $A_{0i}$ are the cylinder ($C_{0i}$) and cylinder axis ($A_{0i}$) at point i, wherein $C_i$ and $A_i$ are the cylinder and cylinder axis the lens has at point i at a particular stage of lens optimization, wherein $S_{0i}$ is the sphere at point i, and $S_i$ is the sphere the lens has at point i at a particular stage of lens optimization, wherein $\alpha_i, \beta_i$ and $\gamma_i$ are numbers that serve as weights to give importance to points, and wherein $M_c$ sight directions through a principal line of the progressive lens.

18. The computing device of claim 16 wherein the term $\Phi'_1$ is computed as $$\Phi'_1 = \sum_{j=1}^{M'} \delta_j (H_j - H_1(H_0))^2,$$

where $H_1$ is a target value for the mean sphere.

19. The computing device of claim 16 wherein the function $$s(H_0) = \begin{cases} N1 & \text{if} & H_0 < -2, \\ N2 & \text{if} & -2 \le H_0 \le 2, \\ N3 & \text{if} & H_0 > 2 \end{cases}$$

wherein the function $s(H_0)$ has values between 1 and 0, including 1, such that $1 \ge N1 > N2 > N3 > 0$.

20. The computing device of claim 16 wherein the function $s(H_0)$ is $$s(H_0) = \begin{cases} 1 & \text{if} & H_0 < -2, \\ 0.8 & \text{if} & -2 \le H_0 \le 2, \\ 0.6 & \text{if} & H_0 > 2 \end{cases}$$

21. The computing device of claim 16 wherein one of the at least one region defining functions is exclusion function $h(y_j)$ which defines a region not used in the computation of C.

22. The computing device of claim 21 wherein $$h(y_j) = \begin{cases} 0 & \text{if} & y_j \ge DRP \\ 2\sqrt{DRP - y_j} & \text{if} & y_j < DRP \end{cases}$$

wherein DRP is a distance reference point.

23. The computing device of claim 16 wherein one of the at least one region defining functions is $g(H_0)$ which is a non-negative function of the prescription mean sphere, $d_j$ is the distance from the point $(x_j, y_j)$ to the principal line along the horizontal direction.

24. The computing device of claim 23 wherein $$g(H_0) = \begin{cases} W1 & \text{if} & H_0 < -2, \\ W2 & \text{if} & -2 \le H_0 \le 2, \\ W3 & \text{if} & H_0 > 2 \end{cases}$$

25. The computing device of claim 16 wherein the region is determined by two defining functions g and h such that $(C_j > g(H_0))$ AND $(d_j > h(y_j))$, wherein $C_j$ is unwanted cylinder at point $(x_j, y_j)$, $g(H_0)$ is a non-negative function of the prescription mean sphere, $d_j$ is the distance from the point $(x_j, y_j)$ to the principal line along the horizontal direction, $h(y_j)$ is a non-negative function of the vertical coordinate.

26. The computing device of claim 16 wherein the determined bound is computed as $H_0+1D$ for high hyperopes and/or high presbyopes, and the determined bound shrinks towards $H_0$ as the prescription mean sphere and/or addition gets smaller, where D is a diopter.

27. The computing device of claim 16 wherein $y_{cutoff}$ is a function of the user prescription such that $y_{cutoff} = NRP - f(H_0)$, wherein NRP is a near reference point.

28. The computing device of claim 27 wherein $$f(H_0) = \begin{cases} V1 & \text{if} & H_0 < -2 \\ V2 & \text{if} & -2 \le H_0 \le 2 \\ V3 & \text{if} & H_0 > 2 \end{cases}$$

wherein y coordinate values V1, V2 and V3 are in millimeters and mean sphere values are in diopters.

* * * * *